US005089313A

United States Patent [19]
Cope

[11] Patent Number: 5,089,313
[45] Date of Patent: Feb. 18, 1992

[54] PROCESS FOR COATING METAL AND PLASTIC TO IMPART WOOD-LIKE APPEARANCES

[75] Inventor: Carroll W. Cope, Marion, Va.

[73] Assignee: Marley Mouldings Inc., Marion, Va.

[21] Appl. No.: 400,271

[22] Filed: Aug. 29, 1989

Related U.S. Application Data

[63] Continuation-in-part of Ser. No. 103,440, Sep. 30, 1987, abandoned, which is a continuation-in-part of Ser. No. 940,904, Dec. 10, 1986, abandoned.

[51] Int. Cl.$^5$ ............................................. D06N 7/04
[52] U.S. Cl. ................................... 428/151; 427/262; 427/267; 524/15
[58] Field of Search ............... 524/15; 427/262, 267; 428/151

[56] References Cited

U.S. PATENT DOCUMENTS

| | | | |
|---|---|---|---|
| 4,546,133 | 10/1985 | Cope | 524/15 |
| 4,638,022 | 1/1987 | Cope | 524/15 |
| 4,722,854 | 2/1988 | Cope | 428/511 |

*Primary Examiner*—Melvyn I. Marquis
*Attorney, Agent, or Firm*—Heller, Ehrman, White & McAuliffe

[57] ABSTRACT

Compositions and a method are provided for forming a coated metal or plastic surface having the appearance and texture of wood grain, which conceals joints on the surface and which is capable of accepting conventional wood stain.

The present method utilizes a basecoat composition for covering a metal or plastic surface comprising a combination of resins, pigments, solvents, and additives for suspension, dispersion, wetting, thickening, flowing and anti-marring. A printing composition is also provided comprising resins, pigments, solvents, and tinting and wetting agents.

12 Claims, No Drawings

PROCESS FOR COATING METAL AND PLASTIC TO IMPART WOOD-LIKE APPEARANCES

This is a continuation-in-part of Ser. No. 103,440, filed Sept. 30, 1987, which, in turn, is a continuation-in-part of Ser. No. 940,904, filed Dec. 10, 1986, both abandoned.

The present invention is directed to a method for coating metal or plastic to render it capable of receiving wood-grain printing inks and conventional wood stains, while also concealing joints and other imperfections.

In the construction uses of metal or plastic, there are many applications in which the appearance of wood would be desired. For example, on exposed surfaces of doors, window frames, and the like, it would be desirable to have the appearance and texture of wood. Moreover, to have a decorative effect, would be desirable to be able to stain a wood-like surface to a desired color, such as walnut, rosewood, and the like, then cover it with a protective coating such as varnish or other conventional clear coating.

It is therefore an object of the present invention to provide compositions which are useful for coating metal or plastic surfaces to impart the grainy appearance of the natural wood.

It is a further object of the present invention to provide novel coatings for metal or plastic surfaces which accept conventional wood stains.

These and other objects will be apparent from the following description and preferred embodiments.

The present method utilizes a basecoat composition for covering a metal or plastic surface comprising a combination of resins, pigments, solvents, and additives for suspension, dispersion, wetting, thickening, flowing and anti-marring. A printing composition is also provided comprising resins, pigments, solvents, and tinting and wetting agents.

The method according to the present invention comprises the steps of applying a novel liquid basecoat onto a metal or plastic surface, evaporating volatile solvents to form a solid coating, and applying a novel ink composition in a wood grain pattern onto the solid coating.

Generally, metal or plastic surface will be first coated with a liquid basecoat composition according to the present invention then dried to remove the volatile solvents. The drying is preferably performed with heat in a conventional oven, but other evaporative methods may be utilized particularly, if a plastic surface is being coated in order to avoid warpage or other deformation. Then a grain ink formulation may be applied in a pattern to simulate a wood grain using a conventional roller having a wood grain pattern using the inks described herein. Apparatus for performing these functions are conventional and known in the art.

The basecoat formulation according to the present invention comprises the following components: alkyd resins, other resins, absorption pigments, other pigments, suspension agent, dispersing agent, wetting agent, thickener, anti-marring agent, flow agent, and solvents.

In general, the basecoat formulation comprises:

| | % volume |
|---|---|
| alkyd resins | 4.66–5.70 |
| styrene-allyl alcohol copolymer | 4.66–5.70 |
| solvents | 41.56–50.78 |
| chlorinated paraffin | 3.79–4.63 |
| tripentaerythritol | 4.25–5.19 |
| ammonium polyphosphate powder | 11.25–13.75 |
| melamine resin | 3.92–4.80 |
| wetting agent | 0.24–0.30 |
| deodorant | 0.25–0.31 |
| ethyl hydroxy ethyl cellulose | 8.06–9.86 |
| pecan shell flour | 1.01–1.23 |
| resimene resins | 1.80–2.20 |
| flow agent | 0.04–0.06 |
| suspension agent | 0.11–0.13 |
| titanium oxide white pigment | 1.17–1.43 |
| vinyl resins | 1.32–1.62 |
| cellulose acetate | 0.96–1.18 |
| dioctyl phthalate | 0.64–0.78 |
| inorganic yellow pigment | 0.10–0.12 |
| talc | 0.06–0.08 |
| cellulose acetate butyrate | 0.14–0.18 |

The solvents preferably comprise 1.27–1.55% (of total volume of the composition) toluene, 4.45–5.43% methyl ethyl ketone, and 3.21–3.93% acetone, in addition to mixtures of various other volatile liquids such as alcohols, hydrocarbons, and the like.

A particularly preferred basecoat composition useful for coating wood contains the following (percentages given by volume).

| | | | Manufacturer |
|---|---|---|---|
| Alkyd resin | 5.18 | Resin | Guardsman |
| RJ-100 Soln. | 5.18 | Suspension Agent | Monsanto |
| Xylene | 26.91 | Solvent | |
| Solvent #150 | 3.30 | Solvent | Chemtech |
| Chlorowax | 4.21 | Anti-mar agent | |
| Tripentaerythritol | 4.72 | Absorption pigment | |
| Phoschek P/30 | 12.50 | Absorption pigment | Monsanto |
| Superfine Melamine | 4.36 | Vehicle resin | Melamine Chem. |
| Collidisperse | .27 | Wetting agent | Troy |
| Deodorant | .28 | | Guardsman |
| EHEC solution | 8.96 | Thickener | Hercules |
| Pecan shell flour | 1.12 | Absorption pigment (45 Micron) | |
| Industrial toluene | 1.41 | Solvent | |
| Resimene #955 | 2.00 | Vehicle resin | Monsanto |
| Lactimon | .05 | Flow agent | BYK Mallinckrodt |
| MPA 2000X | .12 | Suspension agent | NL |
| RHD 6X Titanium | 1.30 | White pigment | Tioxide |
| Methyl ethyl ketone | 4.94 | Solvent | |
| Acetone | 3.57 | Solvent | |
| Lacquer diluent | 5.40 | Dispersing solvent | Ashland |
| VAGH Vinyl | 1.47 | Resin | Union Carbide |
| Cellulose acetate | 1.07 | Solvent | |
| Dioctyl phthalate | .71 | Solvent | |
| 2444-XF Yellow | .11 | Inorganic Pigment | Pfizer |
| Nytal 400 | .07 | Talc | Vanderbilt |
| Jaysol Anhydrons | .17 | Solvent | Eastman |
| MIBK | .47 | Solvent | |
| 1 Sec. CAB 531.1 | .16 | Vehicle resin | Eastman |
| | 100.00 | | |

In the above preferred formulation, in addition to the alkyd resins, the other resins include Melamine (melamine resins sold by Melamine Chemicals), Resimene, a butylated urea resin sold by Monsanto, and CAB (cellulose acetate butyrate, sold by Eastman), all commercially available resins. Such other resins also include polyester resins, including water extended polyesters, polystyrene, vinyl resins including polyvinylacetate, polyvinylchloride, vinylchloride-vinylacetate copolymers and the like; polyamide resins, polyurea resins, and acrylic resins; phenolic resins, maleic resins, coumerone-indene resins, urea-formaldehyde; melamine-formaldehyde resins; epoxy resins, silicone resins, ionomer resins, acetal resins, polyethylene, polypropylene, hydrocarbon resins, rubber derivatives, polycarbonate resins, phenoxy resins, fluorol plastics, styrene-butadiene resins, polyurethane resins, furane resins, polysulfone resins, pentaerythritol resins, ester gum, copalesters, and the like. Natural resins which may be used include shellac, rosin copal resins, damar resins, manila resins and the like.

Absorption pigments which may be utilized include tripentaerythritol, Phoschek P/30 (an ammonium polyphosphate white powder sold by Monsanto), and pecan shell flour, or any combination thereof. The composition will also contain other pigments, which may be inorganic or organic. These pigments include RHD-6X Titanium, Yellow 2444-XF, Nytal 400 (a talc).

The base coat composition will also contain suspension agents, dispersing agents, wetting agents, thickeners, anti-marring agents, flow agents and optionally, deodorant additives to alleviate any offensive smells caused by the base coat. Suspension agents include MPA-2000X (sold by NL Chemicals), and RJ-100 (styrene-allyl alcohol copolymer), both made by Monsanto. Preferred dispersing agents include a lacquer used as a diluent. Preferred wetting agents included Collidisperse, made by Troy Chemical. A preferred thickener includes EHEC (ethyl hydroxy ethyl cellulose) Solution (Hercules). Any readily available anti-marring agent may be used such as Chlorowax (a chlorinated paraffin sold by Diamond Shamrock). A flow agent such as Lactimon (BYK Mallinckrodt) may be utilized.

Typical solvents include xylene, Solvent #150 (Ashland), toluene, methyl ethyl ketone, acetone, cellulose acetate, dioctyl phthalate, Jaysol Anhydrons (Eastman), and MIBK (methyl isobutyl ketone). Other solvents may include turpentine, diapintine, pine oil, petroleum spirits, naphtha, mineral spirits, methyl and ethyl alcohol, toluol, benzol, xylol, ethyl acetate, amyl acetate, and the like. The several portions of any vehicle used in comparing one of the decorative coatings are generally composed of the same basic materials although they may have varied amounts of thinners, solvents, fillers and the like so as to vary their viscosities and other physical properties, but there may be a combination of unrelated resins used on the same panel to provide texture and growth lines.

The pulverized pecan nut shell flour utilized in the base coat composition as an absorption pigment will be in the form of a fine powder, typically grain size of about 42 to 46 microns (preferably 45 average microns). Preferably pecan shell flour will be used.

The amount of the volatile solvents and esters which are utilized will be of the kind in an amount sufficient to dissolve and/or suspend the various components in a uniform liquid suspension material. It is desirable that the solvents comprise some polar solvents, such as acetone and cellulose acetate, and some non-polar solvents such as xylene, and slightly polar solvents such as ketones. Other higher molecular weight solvents may also be utilized such as petroleum distillates, esters, all of which are commercially available.

The particular proportions of the various components used may be generally in the proportions given above. It will be understood however, that various modifications in proportions and components may be utilized without departing from the scope of the present invention.

In addition to the various pigments mentioned above, the base coat may contain various typical inorganic pigments useful for wood grain such as those iron pigments ranging in color from yellow through red, reddish brown, brown to black, similar to those found in natural wood. These iron pigments include yellow ocher, raw and burnt sienna, and raw and burnt umber. Other useful inorganic color pigments include chrome yellow, cadmium sulfide, zinc yellow, cobalt blue, ultramarine blue, iron oxide, chrome green, chromium oxide green, chromium hydroxide green, lamp black carbon, and white pigments such as titanium dioxide, titanium calcium, zinc oxide, zinc sulfide, antimony oxide, lithopone, etc. Organic pigments may also be utilized such as toluidine red, phthalocyanine blue and green, VanDyke brown, alizarin, madder lake, lythol red, etc.

After applying the base coat to the metal or plastic surface, it is dried, for example, in a conventional oven to remove the volatile solvents, thereby forming a hardened base coat. An ink formulation may then be applied to the base coat with a roller having a wood grain pattern. The ink formulation comprises: resins, pigments, absorption pigments, tinting agents, wetting agents, and solvents.

The resins utilized in the above ink formulation include acrylic resins such as Joncryl 74, BALAB, UCAR-SCT 100. The pigments include various pigments utilized to simulate wood grain colors, as described above and include specifically yellow 895-000-1801 (Nuodex), burnt umber (I-347); red oxide 895-1003 (Harshaw), Mearlin silk white (an iridescent pigment). As an absorption pigment Phoschek P/30 may be utilized. As a tinting agent a tint paste such as Benzidine yellow (W-1041) may be utilized. A wetting agent such as glycol ether (PM) is used. Various solvents may be utilized such as DMAE (Union Carbide), water and ethylene glycol.

The pigments which are utilized in the ink formulation will depend upon the color of the wood grain desired. The pigments must, of course, impart a color to the ink formulation which is different from the color of the dried base coat in order to provide contrast. Usually, colorants which impart yellow or brown tones to the base coat will be useful. Typically, the base coat, after application of the ink formulation, will be stained with a conventional wood stain, which usually enhances the contrast between the base coat and the ink.

In general, the ink formulation comprises:

|  | % volume |
| --- | --- |
| acrylic resins | 47.02–57.46 |
| latex resins | 1.74–2.12 |
| ethylene glycol | 2.09–2.55 |
| DMAE | 0.52–0.64 |
| water | 4.64–5.67 |
| glycol ether | 5.77–7.05 |
| yellow pigment | 5.60–6.84 |
| tint paste | 4.41–5.39 |
| burnt umber pigment | 15.09–18.45 |
| red oxide pigment | 0.71–0.87 |
| iridescent pigment | 0.20–0.24 |

-continued

| | % volume |
|---|---|
| ammonium polyphosphate powder | 2.21–2.70 |

A typical ink formulation may comprise the following (% by volume):

| | | | Manufacturer |
|---|---|---|---|
| Joncryl 74 | 52.24 | Acrylic resin | Johnson & Johnson |
| BALAB 3056A | .73 | Resin (latex) | Witco |
| Ethylene glycol | 2.32 | Solvent | |
| DMAE | .58 | Solvent | |
| Tap Water | 5.15 | Solvent | |
| UCAR SCT100 | 1.20 | Resin (latex) | Union Carbide |
| Glycol Ether PM | 6.41 | Wetting agent | Ashland |
| 895-000-1801 Yellow | 6.22 | Pigment | Nuodex |
| W-1041 Benzidine Yellow | 4.90 | Tint paste | Harshaw |
| I-347 Bt. Umber | 16.77 | Pigment | Harshaw |
| 895-1003 Red Oxide | .79 | Pigment | Nuodex |
| Mearline Silk White | .22 | Iridescent pigment | Mearl |
| Phos Chek P/30 fine | 2.45 | Absorption pigment | Monsanto |
| | 100.00 | | |

After application of the graining ink formulation and air drying, the final product may be utilized as is, or stained with a conventional wood stain, then coated with a conventional varnish or other clear preservative.

Having described the specific embodiments of the invention, other modifications and variations will be apparent to those of ordinary skill in the art, which variations and modifications are intended to be within the scope of the present invention.

What is claimed is:

1. A coated metal product comprising a metal substrate and a coating over said substrate formed by placing a liquid coating over said substrate, said liquid comprising:

| | % volume |
|---|---|
| alkyd resins | 4.66–5.70 |
| styrene-allyl alcohol copolymer | 4.66–5.70 |
| solvents | 41.56–50.78 |
| chlorinated paraffin | 3.79–4.63 |
| tripentaerythritol | 4.25–5.19 |
| ammonium polyphosphate powder | 11.25–13.75 |
| melamine resin | 3.92–4.80 |
| wetting agent | 0.24–0.30 |
| deodorant | 0.25–0.31 |
| ethyl hydroxy ethyl cellulose | 8.06–9.86 |
| pecan shell flour | 1.01–1.23 |
| resimene resins | 1.80–2.20 |
| flow agent | 0.04–0.06 |
| suspension agent | 0.11–0.13 |
| titanium oxide white pigment | 1.17–1.43 |
| vinyl resins | 1.32–1.62 |
| cellulose acetate | 0.96–1.18 |
| dioctyl phthalate | 0.64–0.78 |
| inorganic yellow pigment | 0.10–0.12 |
| talc | 0.06–0.08 |
| cellulose acetate butyrate | 0.14–0.18 | and drying said liquid coating to remove volatile solvents.

2. A coated metal product according to claim 1 wherein said liquid comprises:

| | % volume |
|---|---|
| alkyd resins | 5.18 |
| styrene-allyl alcohol copolymer | 5.18 |
| solvents | 46.17 |
| chlorinated paraffin | 4.21 |
| tripentaerythritol | 4.72 |
| ammonium polyphosphate powder | 12.50 |
| melamine resin | 4.36 |
| wetting agent | 0.27 |
| deodorant | 0.28 |
| ethyl hydroxy ethyl cellulose | 8.96 |
| pecan shell flour | 1.12 |
| resimene resins | 2.00 |
| flow agent | 0.05 |
| suspension agent | 0.12 |
| titanium oxide white pigment | 1.30 |
| vinyl resins | 1.47 |
| cellulose acetate | 1.07 |
| dioctyl phthalate | 0.71 |
| inorganic yellow pigment | 0.11 |
| talc | 0.07 |
| cellulose acetate butyrate | 0.16 |
| | 100.00 |

3. A coated product according to claim 1 further comprising a printed pattern upon said coating, said pattern formed by imprinting a liquid ink composition upon said coating, said liquid ink composition comprising:

| | % volume |
|---|---|
| acrylic resins | 47.02–57.46 |
| latex resins | 1.74–2.12 |
| ethylene glycol | 2.09–2.55 |
| DMAE | 0.52–0.64 |
| water | 4.64–5.67 |
| glycol ether | 5.77–7.05 |
| yellow pigment | 5.60–6.84 |
| tint paste | 4.41–5.39 |
| burnt umber pigment | 15.09–18.45 |
| red oxide pigment | 0.71–0.87 |
| iridescent pigment | 0.20–0.24 |
| ammonium polyphosphate powder | 2.21–2.70 | and drying said ink composition to remove volatile solvents.

4. A coated product according to claim 3 wherein said liquid ink composition comprises:

| | % volume |
|---|---|
| acrylic resins | 52.24 |
| latex resins | 1.93 |
| ethylene glycol | 2.32 |
| DMAE | 0.58 |
| water | 5.15 |
| glycol ether | 6.41 |
| yellow pigment | 6.22 |
| tint paste | 4.90 |
| burnt umber pigment | 16.77 |
| red oxide pigment | 0.79 |
| iridescent pigment | 0.22 |
| ammonium polyphosphate powder | 2.45 |
| | 100.00 |

5. A method for forming a coated metal product characterized by a printed wood grain pattern, comprising the steps of:

(a) applying a liquid coating onto a metal surface of said product, said coating comprising

| | % volume |
|---|---|
| alkyd resins | 4.66–5.70 |
| styrene-allyl alcohol copolymer | 4.66–5.70 |
| solvents | 41.56–50.78 |
| chlorinated paraffin | 3.79–4.63 |
| tripentaerythritol | 4.25–5.19 |
| ammonium polyphosphate powder | 11.25–13.75 |
| melamine resin | 3.92–4.80 |
| wetting agent | 0.24–0.30 |
| deodorant | 0.25–0.31 |
| ethyl hydroxy ethyl cellulose | 8.06–9.86 |
| pecan shell flour | 1.01–1.23 |
| resimene resins | 1.80–2.20 |
| flow agent | 0.04–0.06 |
| suspension agent | 0.11–0.13 |
| titanium oxide white pigment | 1.17–1.43 |
| vinyl resins | 1.32–1.62 |
| cellulose acetate | 0.96–1.18 |
| dioctyl phthalate | 0.64–0.78 |
| inorganic yellow pigment | 0.10–0.12 |
| talc | 0.06–0.08 |
| cellulose acetate butyrate | 0.14–0.18 |

(b) evaporating volatile solvents to form a solid coating;

(c) applying an ink composition in a wood grain pattern onto said solid coating, said ink composition comprising

| | % volume |
|---|---|
| acrylic resins | 47.02–57.46 |
| latex resins | 1.74–2.12 |
| ethylene glycol | 2.09–2.55 |
| DMAE | 0.52–0.64 |
| water | 4.64–5.67 |
| glycol ether | 5.77–7.05 |
| yellow pigment | 5.60–6.84 |
| tint paste | 4.41–5.39 |
| burnt umber pigment | 15.09–18.45 |
| red oxide pigment | 0.71–0.87 |
| iridescent pigment | 0.20–0.24 |
| ammonium polyphosphate powder | 2.21–2.70. |

6. A method according to claim 5 wherein said liquid coating comprises:

| | % volume |
|---|---|
| alkyd resins | 5.18 |
| styrene-allyl alcohol copolymer | 5.18 |
| solvents | 46.17 |
| chlorinated paraffin | 4.21 |
| tripentaerythritol | 4.72 |
| ammonium polyphosphate powder | 12.50 |
| melamine resin | 4.36 |
| wetting agent | 0.27 |
| deodorant | 0.28 |
| ethyl hydroxy ethyl cellulose | 8.96 |
| pecan shell flour | 1.12 |
| resimene resins | 2.00 |
| flow agent | 0.05 |
| suspension agent | 0.12 |
| titanium oxide white pigment | 1.30 |
| vinyl resins | 1.47 |
| cellulose acetate | 1.07 |
| dioctyl phthalate | 0.71 |
| inorganic yellow pigment | 0.11 |
| talc | 0.07 |
| cellulose acetate butyrate | 0.16 |
| | 100.00; | and said ink composition comprises

| | % volume |
|---|---|
| acrylic resins | 52.24 |
| latex resins | 1.93 |
| ethylene glycol | 2.32 |
| DMAE | 0.58 |
| water | 5.15 |
| glycol ether | 6.41 |
| yellow pigment | 6.22 |
| tint paste | 4.90 |
| burnt umber pigment | 16.77 |
| red oxide pigment | 0.79 |
| iridescent pigment | 0.22 |
| ammonium polyphosphate powder | 2.45 |
| | 100.00. |

7. A coated plastic product comprising a plastic substrate and a coating over said substrate formed by placing a liquid coating over said substrate, said liquid comprising:

| | % volume |
|---|---|
| alkyd resins | 4.66–5.70 |
| styrene-allyl alcohol copolymer | 4.66–5.70 |
| solvents | 41.56–50.78 |
| chlorinated paraffin | 3.79–4.63 |
| tripentaerythritol | 4.25–5.19 |
| ammonium polyphosphate powder | 11.25–13.75 |
| melamine resin | 3.92–4.80 |
| wetting agent | 0.24–0.30 |
| deodorant | 0.25–0.31 |
| ethyl hydroxy ethyl cellulose | 8.06–9.86 |
| pecan shell flour | 1.01–1.23 |
| resimene resins | 1.80–2.20 |
| flow agent | 0.04–0.06 |
| suspension agent | 0.11–0.13 |
| titanium oxide white pigment | 1.17–1.43 |
| vinyl resins | 1.32–1.62 |
| cellulose acetate | 0.96–1.18 |
| dioctyl phthalate | 0.64–0.78 |
| inorganic yellow pigment | 0.10–0.12 |
| talc | 0.06–0.08 |
| cellulose acetate butyrate | 0.14–0.18 | and drying said liquid coating to remove volatile solvents.

8. A coated plastic product according to claim 7 wherein said liquid comprises:

| | % volume |
|---|---|
| alkyd resins | 5.18 |
| styrene-allyl alcohol copolymer | 5.18 |
| solvents | 46.17 |
| chlorinated paraffin | 4.21 |
| tripentaerythritol | 4.72 |
| ammonium polyphosphate powder | 12.50 |
| melamine resin | 4.36 |
| wetting agent | 0.27 |
| deodorant | 0.28 |
| ethyl hydroxy ethyl cellulose | 8.96 |
| pecan shell flour | 1.12 |
| resimene resins | 2.00 |
| flow agent | 0.05 |
| suspension agent | 0.12 |
| titanium oxide white pigment | 1.30 |
| vinyl resins | 1.47 |
| cellulose acetate | 1.07 |
| dioctyl phthalate | 0.71 |
| inorganic yellow pigment | 0.11 |
| talc | 0.07 |
| cellulose acetate butyrate | 0.16 |
| | 100.00. |

9. A coated product comprising a plastic substrate, a coating over said substrate and a pattern formed by imprinting a liquid ink composition upon said coating; wherein said coating is formed by placing a liquid over said substrate, said liquid comprising:

|  | % volume |
|---|---|
| alkyd resins | 4.66–5.70 |
| styrene-allyl alcohol copolymer | 4.66–5.70 |
| solvents | 41.56–50.78 |
| chlorinated paraffin | 3.79–4.63 |
| tripentaerythritol | 4.25–5.19 |
| ammonium polyphosphate powder | 11.25–13.75 |
| melamine resin | 3.92–4.80 |
| wetting agent | 0.24–0.30 |
| deodorant | 0.25–0.31 |
| ethyl hydroxy ethyl cellulose | 8.06–9.86 |
| pecan shell flour | 1.01–1.23 |
| resimene resins | 1.80–2.20 |
| flow agent | 0.04–0.06 |
| suspension agent | 0.11–0.13 |
| titanium oxide white pigment | 1.17–1.43 |
| vinyl resins | 1.32–1.62 |
| cellulose acetate | 0.96–1.18 |
| dioctyl phthalate | 0.64–0.78 |
| inorganic yellow pigment | 0.10–0.12 |
| talc | 0.06–0.08 |
| cellulose acetate butyrate | 0.14–0.18 | and drying said liquid to remove volatile solvents; and said printed pattern is formed by imprinting a liquid ink composition upon said coating wherein said liquid ink composition comprises:

|  | % Volume |
|---|---|
| acrylic resins | 47.02–57.46 |
| latex resins | 1.74–2.12 |
| ethylene glycol | 2.09–2.55 |
| DMAE | 0.52–0.64 |
| water | 4.64–5.67 |
| glycol ether | 5.77–7.05 |
| yellow pigment | 5.60–6.84 |
| tint paste | 4.41–5.39 |
| burnt umber pigment | 15.09–18.45 |
| red oxide pigment | 0.71–0.87 |
| iridescent pigment | 0.20–0.24 |
| ammonium polyphosphate powder | 2.21–2.70 |

10. A coated product according to claim 9 wherein said liquid ink composition comprises:

|  | % volume |
|---|---|
| acrylic resins | 52.24 |
| latex resins | 1.93 |
| ethylene glycol | 2.32 |
| DMAE | 0.58 |
| water | 5.15 |
| glycol ether | 6.41 |
| yellow pigment | 6.22 |
| tint paste | 4.90 |
| burnt umber pigment | 16.77 |
| red oxide pigment | 0.79 |
| iridescent pigment | 0.22 |
| ammonium polyphosphate powder | 2.45 |
|  | 100.00. |

11. A method for forming a coated plastic product characterized by a printed wood grain pattern, comprising the steps of:
(a) applying a liquid coating onto a plastic surface of said product, said coating comprising

|  | % volume |
|---|---|
| alkyd resins | 4.66–5.70 |
| styrene-allyl alcohol copolymer | 4.66–5.70 |
| other solvents | 41.56–50.78 |
| chlorinated paraffin | 3.79–4.63 |
| tripentaerythritol | 4.25–5.19 |
| ammonium polyphosphate powder | 11.25–13.75 |
| melamine resin | 3.92–4.80 |
| wetting agent | 0.24–0.30 |
| deodorant | 0.25–0.31 |
| ethyl hydroxy ethyl cellulose | 8.06–9.86 |
| pecan shell flour | 1.01–1.23 |
| resimene resins | 1.80–2.20 |
| flow agent | 0.04–0.06 |
| suspension agent | 0.11–0.13 |
| titanium oxide white pigment | 1.17–1.43 |
| vinyl resins | 1.32–1.62 |
| cellulose acetate | 0.96–1.18 |
| dioctyl phthalate | 0.64–0.78 |
| inorganic yellow pigment | 0.10–0.12 |
| talc | 0.06–0.08 |
| cellulose acetate butyrate | 0.14–0.18 |

(b) evaporating volatile solvents to form a solid coating;
(c) applying an ink composition in a wood grain pattern onto said solid coating, said ink composition comprising

|  | % volume |
|---|---|
| acrylic resins | 47.02–57.46 |
| latex resins | 1.74–2.12 |
| ethylene glycol | 2.09–2.55 |
| DMAE | 0.52–0.64 |
| water | 4.64–5.67 |
| glycol ether | 5.77–7.05 |
| yellow pigment | 5.60–6.84 |
| tint paste | 4.41–5.39 |
| burnt umber pigment | 15.09–18.45 |
| red oxide pigment | 0.71–0.87 |
| iridescent pigment | 0.20–0.24 |
| ammonium polyphosphate powder | 2.21–2.70 |

12. A method according to claim 11 wherein said liquid coating comprises

|  | % volume |
|---|---|
| alkyd resins | 5.18 |
| styrene-allyl alcohol copolymer | 5.18 |
| other solvents | 46.17 |
| chlorinated paraffin | 4.21 |
| tripentaerythritol | 4.72 |
| ammonium polyphosphate powder | 12.50 |
| melamine resin | 4.36 |
| wetting agent | 0.27 |
| deodorant | 0.28 |
| ethyl hydroxy ethyl cellulose | 8.96 |
| pecan shell flour | 1.12 |
| resimene resins | 2.00 |
| flow agent | 0.05 |
| suspension agent | 0.12 |
| titanium oxide white pigment | 1.30 |
| vinyl resins | 1.47 |
| cellulose acetate | 1.07 |
| dioctyl phthalate | 0.71 |
| inorganic yellow pigment | 0.11 |
| talc | 0.07 |
| cellulose acetate butyrate | 0.16 |
|  | 100.00; | and said ink composition comprises

|                 | % volume |
|-----------------|----------|
| acrylic resins  | 52.24    |
| latex resins    | 1.93     |
| ethylene glycol | 2.32     |
| DMAE            | 0.58     |
| water           | 5.15     |
| glycol ether    | 6.41     |

-continued

|                              | % volume |
|------------------------------|----------|
| yellow pigment               | 6.22     |
| tint paste                   | 4.90     |
| burnt umber pigment          | 16.77    |
| red oxide pigment            | 0.79     |
| iridescent pigment           | 0.22     |
| ammonium polyphosphate powder| 2.45     |
|                              | 100.00   |

* * * * *

UNITED STATES PATENT AND TRADEMARK OFFICE
CERTIFICATE OF CORRECTION

PATENT NO. : 5,089,313
DATED : February 18, 1992
INVENTOR(S) : Carroll W. Cope

It is certified that error appears in the above-indentified patent and that said Letters Patent is hereby corrected as shown below:

In Column 2, line 62: "1 Sec. CAB" should be -- 1 Sec. CAB 531.1--.

In Column 2, line 63: "531.1" should be deleted.

Signed and Sealed this

Twenty-ninth Day of June, 1993

Attest:

MICHAEL K. KIRK

*Attesting Officer*  *Acting Commissioner of Patents and Trademarks*